3,238,210
MANUFACTURE OF A THIACHROMONOACRI-
DONE-CONTAINING PIGMENT
Donald Graham Wilkinson, Manchester, England, assignor to Imperial Chemical Industries Limited, London, England, a corporation of Great Britain
No Drawing. Filed Apr. 15, 1963, Ser. No. 272,844
Claims priority, application Great Britain, Apr. 30, 1962, 16,358/62
4 Claims. (Cl. 260—279)

This invention relates to a pigment manufacturing process and more particularly to a process for the manufacture of thiachromonoacridones.

British Patent No. 911,206 corresponding to U.S. Patent 3,109,002 describes and claims pigments of the thiachromono[2:3-b]acridone series, in which the parent ring system is as follows:

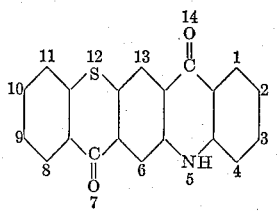

The specification describes the manufacture of thiachromonoacridones from 2-chloro-5-nitroterephthalic acid or an ester thereof by condensation with a mercapto compound or amine followed by reduction of the nitro group to amino, replacement of the amino group by a halogen atom by means of the Sandmeyer reaction, and subsequent condensation with an amine or mercapto compound and cyclisation of the resultant dicarboxylic acid. It is also disclosed that thiachromonoacridones may be obtained from dialkyl 2:5-dihalogenoterephthalates by condensation with a mercapto compound and an amine (if desired without isolation of the intermediate condensation product), hydrolysis of the ester groups and cyclisation of the resultant dicarboxylic acid.

When a dialkyl 2:5-dihalogenoterephthalate is condensed with an aryl mercapto compound and an arylamine, the arylmercapto compound reacts more rapidly than the arylamine and in consequence the principal product is a dialkyl 2:5-bis(arylmercapto)terephthalate. Only a small quantity of dialkyl 2-arylmercapto-5-arylaminoterephthalate is formed.

It has now been found that condensation of a dialkyl 2:5-dihalogenoterephthalate with an arylmercapto compound and an acyl derivative (as hereinafter defined) of an arylamine and subsequent hydrolysis of the condensate produces a 2-arylmercapto-5-arylaminoterephthalic acid in good yield. Depending on the proportions of mercapto compound and acyl derivative used, a 2:5-di(arylmercapto)terephthalic acid and/or a 2:5-di(arylamino) terephthalic acid may be formed as byproducts.

According to the invention, there is provided a process for the manufacture of a thiachromonoacridone-containing pigment which comprises condensing a dialkyl 2:5-dihalogenoterephthalate with an arylmercapto compound and an arylamine acyl derivative of the formula ArNH.COR wherein R is hydrogen or a lower alkoxy radical, hydrolysing the product and cyclising the resultant dicarboxylic acids.

Condensation of a dialkyl 2:5-dihalogenoterephthalate (for example dimethyl or diethyl 2:5-dichloro- or 2:5-dibromoterephthalate) with an arylmercapto compound and an acyl derivative of an arylamine may be carried out simultaneously, or if desired either the mercapto compound or acyl derivative may be condensed first and the other compound may then be added to the reaction mixture. The condensation may conveniently be carried out by heating the reactants with an organic solvent, especially a basic solvent such as pyridine, dimethylacetamide, picoline, dimethylformamide or N-methylpyrrolidone and an acid-binding agent such as sodium or potassium carbonate, hydroxide, methoxide or acetate at an elevated temperature, for example between 100° and 150° C. for about 10 to 20 hours. The dicarboxylic acid may be obtained from the reaction mixture by diluting with water, making alkaline with sodium hydroxide and heating until hydrolysis to the dicarboxylic acid is complete, steam distilling off the solvent if desired, filtering the solution, acidifying and filtering off the precipitate. Cyclisation of the dicarboxylic acid may then be carried out by any of the methods described in British Patent No. 911,206, e.g., by treating with a dehydrating agent such as sulphuric acid, phosphoric acid, polyphosphoric acid or chlorosulphonic acid or by conversion to the acid chloride, followed by heating in presence of aluminium chloride.

Arylmercapto compounds which may be used in the process of the invention include for example thiophenol, substituted thiophenols such as the thiocresols, chlorothiophenols, bromothiophenols and methoxythiophenols.

Arylamine acyl derivatives which may be used in the process of the invention include for example methyl, ethyl, propyl, and butyl carbamates derived from such arylamines as aniline, substituted anilines such as the toluidines, chloroanilines, bromoanilines, methoxyanilines and ethoxyanilines. The preferred acyl derivatives for use in the process of the invention are, however, the formyl derivatives since these compounds are much more reactive than other acyl derivatives. Arylmercapto compounds and formyl derivatives of arylamines react with dialkyl-2:5-dihalogenoterephthalates with approximately the same speed.

The pigments obtained by carrying out the process of the invention are mixtures of thiachromonoacridones with benzobisthiachromones and/or linear quinacridones. Such mixtures are directly useful and may be obtained in soft textured form suitable for coloration purposes, by the usual techniques such as grinding, milling with gravel, sand or other particulate grinding elements, or salt milling. Solid solutions in which the components of the mixture all enter the same crystal structure may be obtained from the products by application of the techniques described in co-pending U.S. application Serial No. 272,845.

If desired, pure thiachromonoacridones may be isolated from the mixed products obtained from the process of the invention by fractional precipitation from sulphuric acid. When a sulphuric acid solution of a product containing all three possible components is gradually diluted with water the benzobisthiachromone is first precipitated and may be filtered off. On adding more water to the filtrate the thiachromonoacridone is precipitated and may be filtered off, while the linear quinacridone remains in solution.

Alternatively, a pure 2-arylamino-5-arylmercapto-terephthalic acid may be isolated from the mixture obtained by condensing an aryl mercapto compound and arylamine acyl derivative as hereinbefore defined with a dialkyl-2:5-dihalogenoterephthalate by slowly reducing the pH of an alkaline solution, then causing a fractional precipitation to occur. The pure dicarboxylic acid may then be cyclised by any of the methods described in British Patent No. 911,206.

Benzobisthiachromone pigments and their manufacture by cyclisation of 2:5-di-(arylmercapto)terephthalic acids are within the claims of United Kingdom Patent No. 851,571.

The invention is illustrated but not limited by the following examples in which the parts are by weight:

*Example 1*

7.0 parts of dimethyl 2:5-dibromoterephthalate, 6.5 parts of p-chloroformanilide, 2.0 parts of p-chlorothiophenol, 4.2 parts of anhydrous potassium carbonate and 0.2 part of cupric acetate dihydrate are stirred with 25 parts of dry pyridine at reflux temperature for 20 hours. A solution of 5 parts of sodium hydroxide in 40 parts of ethanol and 60 parts of water is added and the mixture is steam distilled to remove the pyridine. The liquor is filtered from tar and the yellow brown filtrate is made strongly acid with acetic acid. The precipitated red acid is filtered off, washed and dried. It can be shown by paper chromatography of the ammonium salt using n-butanol:N.aqueous ammonia as the eluting medium and then developing with dilute hydrochloric acid that the product consists of 2-(p-chloroanilino)-5-(p-phenylmercapto)-terephthalic acid and 2:5-bis-(p-chloroanilino)-terephthalic acid and only a minute trace of 2:5-bis-(p-chlorophenylmercapto)-terephthalic acid.

6.0 parts of the above mixed acids are added gradually to 35 parts of polyphosphoric acid (containing 85% $P_2O_5$) stirring at 180° C. during 2 hours. Heating is continued at 180° C. for a further 2 hours. The melt is then allowed to cool, diluted by gradual addition of water and then poured when fluid into an excess of cold water. The precipitated red product is filtered off and washed free from acid. It is freed from alkali-soluble material by boiling with dilute sodium carbonate solution and then filtered and washed free from alkali. The moist filter cake is intimately mixed with 0.5 part of pine oil and 0.25 part of concentrated aqueous ammonia and dried at 40°. A bright bluish red pigment is so obtained which contains 2:9-dichloro-thiachromonoacridone and 2:9-dichloro-quinacridone.

*Example 2*

A mixture of 7.0 parts of dimethyl 2:5-dibromoterephthalate, 4.8 parts of formanilide, 2.3 parts of p-chlorothiophenol, 4.2 parts of potassium carbonate, 0.2 part of cupric acetate and 25 parts of dry pyridine is stirred at 140° to 150° C. for 20 hours under reflux. A solution of 5 parts of sodium hydroxide in 40 parts of ethanol and 60 parts of water is added and the mixture is steam distilled to remove the pyridine. The liquor is filtered from tar, and the yellow brown filtrate is acidified with acetic acid. The red precipitate is filtered off, washed and dried. It can be shown by paper chromatography (using the technique described in Example 1) to consist of 2:5-di-anilino-terephthalic acid and 2-anilino-5-(4′-chlorophenylmercapto)-terephthalic acid and only a trace of 2:5-di-(p-chlorophenylmercapto)-terephthalic acid.

The mixture of dicarboxylic acids is added gradually to 35 parts of polyphosphoric acid and stirred at 180° for 3 hours. The product is isolated by the method described in Example 1. A bright bluish red powder is obtained consisting of 9-chlorothiachromonoacridone and quinacridone and containing only a trace of 2:9-dichloro-benzobisthiachromone.

*Example 3*

A mixture of 7.0 parts of dimethyl 2:5-dibromo-terephthalate, 5.75 parts of o-chlorothiophenol, 9.9 parts of phenylurethane (N-phenylethylcarbamate) 4.2 parts of potassium carbonate and 0.2 part of cupric aceate is stirred with 30 parts of pyridine at 140° to 150° C. under reflux for 20 hours. It is then diluted with a solution of 4 parts of sodium hydroxide in about 50 parts of water and 60 parts of ethanol and steam distilled to remove the pyridine. The liquid is filtered from some tarry impurities, acidified with acetic acid and the yellow precipitate is filtered off, washed and dried. It consists of 2:5-di(o-chlorophenylmercapto)-terephthalic acid and 2-(o-chlorophenyl-mercapto)-5-anilino-terephthalic acid.

The mixture of dicarboxylic acids is stirred at 100° under reflux with 80 parts of monochlorobenzene and 7.4 parts of thionyl chloride for 4 hours. After cooling to room temperature, 5.9 parts of aluminium chloride are added and the temperature is raised to 100 to 130° C. for 2 hours. The melt is poured into dilute hydrochloric acid, monochlorobenzene is removed by steam distillation and the yellow product is filtered off and dried. It consists of 11-chlorothiachromonoacridone and 4:11-dichlorobenzobisthiachromone.

*Example 4*

A mixture of 10.0 parts of dimethyl 2:5-dibromoterephthalate, 8.2 parts of p-chloroformanilide, 3.8 parts of p-chlorothiophenol, 6.0 parts of potassium carbonate and 0.3 part of cupric acetate is stirred at reflux temperature with 30 parts of pyridine for 20 hours. The mixture is diluted with a solution of 10 parts of sodium hydroxide in 100 parts of water and 50 parts of ethanol, the pyridine is removed by steam distillation and the residual liquid is filtered from same tarry byproduct and is then acidified with acetic acid. The reddish precipitate is filtered off, washed and dried. It consists of 2:5-di(p-chlorophenylmercapto)-terephthalic acid, 2-(p-chlorophenylmercapto) - 5 - (p-chlorophenylamino)-terephthalic acid and 2:5-di(p-chlorophenylamino)-terephthalic acid.

5.5 parts of the above dicarboxylic acids are cyclised by heating with 30 parts of polyphosphoric acid at 180° for 5 hours as described in Example 1. A bright bluish red pigment is obtained which contains 7.6% of sulphur and 3.5% of nitrogen. It is a mixture of 2:9-dichloro-thiachromonoacridone, 2:9 - dichlorobenzobisthiachromone and 2:9-dichloroquinacridone.

*Example 5*

A mixture of 14.0 parts of dimethyl 2:5-dibromoterephthalate, 8.05 parts of p-chlorothiophenol, 8.65 parts of o-chloroformanilide, 8.4 parts of potassium carbonate and 0.4 part of cupric acetate was stirred with 40 parts of pyridine at reflux temperature for 20 hours. The mixture is diluted with a solution of 15 parts of sodium hydroxide in 100 parts of water and 80 parts of ethanol, the pyridine is removed by steam distillation and the residual liquid is filtered from traces of tar and acidified with acetic acid. The orange precipitate of mixed acids is filtered off, washed and dried. It consists of 2:5-di-(p-chlorophenyl-mercapto)-terephthalic acid and 2-(o-chlorophenylamino)-5-(p-chlorophenylmercapto) - terephthalic acid.

The dicarboxylic acids so obtained are mixed with 70 parts of polyphosphoric acid and stirred at 180° C. for 5 hours. The melt is diluted with water, filtered and the crude orange pigment is extracted with hot dilute sodium carbonate solution. It is then filtered, washed and dried. It consists of a mixture of 2:9-dichloro-benzobisthiachromone and 4:9-dichloro-thiachromonoacridone. The latter can be separated in a pure state as follows:

The crude pigment is dissolved in 184 parts of concentrated sulphuric acid stirring at room temperature. 14.0 parts of water are then added gradually with cooling. Crystals of 2:9-dichloro-benzobisthiachromone sulphate are precipitated and after stirring for 2 hours this is filtered off. The filtrate is stirred at room temperature and a further 14 parts of water are added gradually. 4:9-dichloro-thiachromonoacridone sulphate is precipitated in dark coloured needle shaped crystals. It is filtered off, stirred with water to hydrolyse the sulphate, again filtered and washed free from acid. It is obtained as a yellow powder, containing 3.6% of nitrogen and 7.7% of sulphur. 4:9-dichloro-thiachromonoacridone, $C_{20}H_9O_2NSCl_2$ requires 3.5% of nitrogen and 8.0% of sulphur.

Example 6

A mixture of 14.0 parts of dimethyl 2:5-dibromo-terephthalate, 8.7 parts of p-chloroformanilide, 10.0 parts of 2:4-dichlorothiophenol, 8.4 parts of potassium carbonate and 0.4 part of cupric acetate dihydrate is stirred under reflux with 50 parts of dry pyridine for 20 hours. The product is isolated as described in Examples 1 to 5. 16.1 parts of an orange red product are obtained. 5 parts are cyclised by heating with 5.8 parts of thionyl chloride in 60 parts of monochlorobenzene at 100° for 4 hours, cooling to room temperature, adding 4.5 parts of powdered aluminium chloride and heating at 130° for 2 hours. The orange pigment is isolated as described in Example 3.

Example 7

A mixture of 7 parts of dimethyl 2:5-dibromo-terephthalate, 4.7 parts of 4-chloro-2-methyl-thiophenol, 4.0 parts of p-chloroformanilide, 4.2 parts of anhydrous potassium carbonate and 0.2 part of copper acetate is stirred under reflux with 25 parts of dry pyridine for 20 hours. The product (7.5 parts), consisting of a mixture of 2:5-di-(4-chloro-2-methylphenylmercapto)-terephthalic acid and 2-(4-chloro-2-methylphenylmercapto)-5-(4-chlorophenylamino)-terephthalic acid, is isolated as described in Examples 1 to 5. It is cyclised by heating with 10.1 parts of thionyl chloride in 100 parts of monochlorobenzene at 100° for 4 hours, cooling to room temperature, adding 7.4 parts of powdered aluminium chloride and heating at 130° for 2 hours. The orange pigment is isolated as described in Example 3. It may be purified by dissolving in sulphuric acid and fractionally precipitating by controlled addition of water.

Example 8

7.0 parts of dimethyl 2:5-dibromoterephthalate, 4.1 parts of p-chlorothiophenol, 2.1 parts of anhydrous potassium carbonate and 0.2 part of cupric acetate dihydrate are stirred under reflux with 25 parts of dry pyridine for 2 hours. 4.3 parts of p-chloroformanilide and 2.1 parts of anhydrous potassium carbonate are then added and the heating is continued for a further 18 hours. The product, which consists of a mixture of 2:5-di-(p-chlorophenylmercapto)-terephthalic acid and 2 - (p - chlorophenylmercapto) - 5 - (p - chloroanilino)-terephthalic acid is isolated as described in the preceding examples. By successive treatment with thionyl chloride and aluminium chloride in chlorobenzene as described in Examples 5 to 7, 4.5 parts of a bright orange red pigment are obtained. This contains 2:9-dichlorothiachromonoacridone and 2:9-dichlorobenzobisthiachromone.

If in the above example the p-chloroformanilide is added first and the reaction mixture is heated for 4 hours followed by the addition of the p-chlorothiophenol and a final period of 18 hours heating a mixed pigment is obtained which has a considerably redder shade. This is due to the formation of 2:9-dichloroquinacridone in the reaction.

Example 9

A mixture of 7.0 parts of dimethyl 2:5-dibromoterephthalate, 4.0 parts of p-chlorothiophenol, 4.3 parts of p-chloroformanilide, 3.2 parts of anhydrous sodium carbonate and 0.2 part of cupric acetate dihydrate is stirred under reflux with 25 parts of dry pyridine for 20 hours. The product is isolated as described in Examples 1 to 5 and cyclised by successive treatment with thionyl chloride followed by aluminium chloride in chlorobenzene as described in Examples 6 to 7. A bright orange pigment is obtained containing 2:9-dichlorothiachromonoacridone and 2:9-dichlorobenzobisthiachromone.

Example 10

A mixture of 7.0 parts of dimethyl 2:5-dibromoterephthalate, 1.3 parts of thiophenol, 2.0 parts of p-chlorothiophenol, 4.65 parts of p-chloroformanilide, 4.2 parts of anhydrous potassium carbonate and 0.2 part of cupric acetate dihydrate is stirred at the boil for 20 hours with 25 parts of pyridine.

The product which contains 2-(p-chlorophenylamino)-5-(phenylmercapto)-terephthalic acid and 2-(p-chlorophenylamino) - 5 - (p - chlorophenylmercapto) - terephthalic acid along with other components is isolated as described in Examples 1 to 5 and cyclised by treatment with thionyl chloride and aluminium chloride as described in Example 5 to give a bright red pigment. This can be purified by dissolving in 43 parts of concentrated sulphuric acid slowly adding 7 parts of water, and filtering off the precipitate, washing with dilute sulphuric acid and boiling the filter cake with dilute ammonia.

Example 11

A mixture of 7 parts of dimethyl 2:5-dibromoterephthalate, 3.25 parts of p-methyl formanilide, 4.6 parts of p-chlorothiophenol, 4.2 parts of potassium carbonate and 0.2 part of cupric acetate dihydrate is stirred and refluxed with 25 parts of pyridine for 20 hours. The product is isolated as described in Examples 1 to 5 and cyclised by heating with 40 parts of polyphosphoric acid at 180° for 5 hours. The red pigment (7.0 parts) may be purified by dissolving in 130 parts of concentrated sulphuric acid and precipitating by adding 21 parts of water. The pigment is finally isolated by diluting with ethanol, filtering, washing with ethanol and drying. It forms a bright red powder.

Example 12

7 parts of dimethyl 2:5-dibromoterephthalate, 3.7 parts of p-chlorothiophenol, 4.6 parts of p-chloroformanilide, 4.2 parts of potassium carbonate and 0.2 part of cupric acetate and 25 parts of dry pyridine are stirred under reflux for 20 hours. 7.5 parts of mixed acids are obtained. This is cyclised by treatment with thionyl chloride in monochlorobenzene and aluminium chloride as described in Example 5. The dark aluminium chloride complex is filtered off and decomposed with dilute hydrochloric acid to give a red pigment. A similar product is obtained when the condensation is carried out in dimethylformamide in place of pyridine.

Example 13

A mixture of 7.0 parts of dimethyl 2:5-dibromo-terephthalate, 3.6 parts of p-methoxy-thiophenol, 4.5 parts of p-methoxyformanilide, 4.2 parts of potassium carbonate, 0.2 part of copper acetate and 25 parts of dry pyridine is stirred at the boil for 20 hours. The orange yellow mixed product (7.3 parts), consisting of a mixture of 2:5-di(p-methoxyphenylmercapto)-terephthalic acid and 2-(p-methoxyphenylmercapto)-5-(p-methoxyphenylamino)-terephthalic acid is isolated by making the liquor strongly alkaline, steam distilling off the pyridine, acidifying, filtering off the precipitate and drying. 7.2 parts of this product are cyclised by heating with 10.0 parts of thionyl chloride in 90 parts of monochlorobenzene at 100° for 4 hours. The solution is cooled to room temperature, 6.9 parts of powdered aluminum chloride is slowly added with stirring, and the temperature is raised to 130° for 2 hours. The melt is poured into dilute hydrochloric acid, monochlorobenzene is removed by steam distillation and the red-brown product is filtered off and dried. The crude pigment is purified by dissolving in 36 parts of 95% sulphuric acid with good stirring, precipitating by adding slowly 7 parts of water, filtering and washing with diluted acid of the same strength. The filter cake is then added to water, boiled with excess of dilute ammonia, filtered and dried. The red brown product is a mixture of 2:9-dimethoxy-thiachromonoacridone and 2:9-dimethoxy-benzobisthiachromone.

Example 14

7 parts of dimethyl 2:5-dibromoterephthalate is reacted with 4.9 parts of p-bromothiophenol, and 4.6 parts of p-chloroformanilide by stirring and heating for 20 hours with 4.2 parts of potassium carbonate, 0.2 part of cupric acetate and 25 parts of pyridine. The mixed acids are isolated by making the liquor strongly alkaline, steam distilling off the pyridine, acidifying, filtering off the precipitate and drying.

The dry product (8.2 parts) is then refluxed for 4 hours with 8.8 parts of thionyl chloride in 90 parts of monochlorobenzene, 6.5 parts of powdered aluminium chloride is added and the temperature is raised to 100° to 130° C. for 2 hours. The melt is poured into dilute hydrochloric acid, monochlorobenzene is steam distilled off and the red product is filtered off and dried. It can be purified by dissolving in 59 parts of concentrated sulphuric acid and then adding gradually 12 parts of water with good stirring. The precipitated pigment is filtered off, boiled up with dilute aqueous ammonia, washed and dried.

Analysis shows the product to contain 1.7% of nitrogen and 8.0% of sulphur. It consists mainly of 2-chloro-9-bromo-thiachromonoacridone, some 2:9-dibromo-benzo-bisthiachromone and a little 2:9-dichloro-quinacridone.

In place of dimethyl 2:5-dibromoterephthalate in the above examples a stoichiometric amount of diethyl, dipropyl or dibutyl 2:5-dibromoterephthalate or dichloroterephthalate may be used.

The arylamine acyl derivatives used in the examples may be replaced by any of the following o-, m- and p-bromoformanilide
o-, m- and p-methylformanilide
o-, m- and p-ethoxyformanilide
2:4-dimethylformanilide
2-chloro-4-methylformanilide
Methyl phenylcarbamate
Butyl phenylcarbamate
Ethyl 4-chlorophenylcarbamate.

The thiophenols used in the examples may be replaced by any of the following o-, m- and p-bromothiophenol
o-, m- and p-thiocresol
2:4-dimethylthiophenol
4-chloro-2-methoxythiophenol
o, m- and p-ethoxythiophenol.

In place of pyridine in the examples, other basic solvents may be used, as previously indicated. The composition of the mixture of dicarboxylic acids produced is influenced by the choice of solvent and of acid-binding agent. Thus replacement of pyridine by dimethylformamide reduces slightly the proportion of 2:5-diarylmercaptoterephthalic acid in the product. The use of pyridine together with sodium carbonate or hydroxide gives products containing smaller proportions of 2:5-diarylaminoterephthalic acid than the corresponding products obtained by use of pyridine and potassium carbonate. Potassium acetate does not appear to be a very effective acid-binding agent for use in the process, and when used with dimethylformamide it yields products consisting mainly of 2:5-di(arylmercapto)terephthalic acid, with only a small proportion of 2-arylamino-5-arylmercaptoterephthalic acid and no 2:5-diarylaminoterephthalic acid.

What is claimed is:

1. In a process for the manufacture of a thiachromonoacridone pigment by preparing a 2-phenylamino-5-phenylmercaptoterephthalic acid and cyclizing the acid to form a thiachromonoacridone, the improvement which comprises preparing said acid by reacting (1) a dialkyl-2:5-diahalogenoterephthalate wherein the halogen is selected from the group consisting of chlorine and bromine, with (2) a thiophenol in which any substituents are selected from the class consisting of chlorine and bromine atoms and methyl, methoxyl and ethoxyl radicals and (3) an arylamine acyl derivative of the formula ArNH.CO.R wherein Ar represents a phenyl radical in which any substituents are selected from the class consisting of chlorine and bromine atoms and methyl, methoxyl and ethoxyl radicals and R is a member of the class consisting of hydrogen atoms and lower alkoxy radicals, by heating said reactants in the presence of a basic solvent, an acid-binding agent and a copper catalyst, and hydrolyzing the resulting reaction product to give said acid.

2. A process according to claim 1 wherein the basic solvent is selected from the class consisting of pyridine, picoline, dimethylacetamide, dimethylformamide and N-methylpyrrolidone.

3. A process according to claim 1 wherein the acid-binding agent is selected from the class consisting of sodium and potassium carbonates, hydroxides, methoxides and acetates.

4. A process according to claim 1 wherein said mixture is hydrolyzed by diluting with water, adding sufficient sodium hydroxide to make said mixture alkaline and heating until hydrolysis is complete.

References Cited by the Examiner
UNITED STATES PATENTS 3,109,002  10/1963  Wilkinson _____ 260—279

NICHOLAS S. RIZZO, *Primary Examiner.*

DON M. KERR, DONALD G. DAUS,
*Assistant Examiners.*